Figure 1:
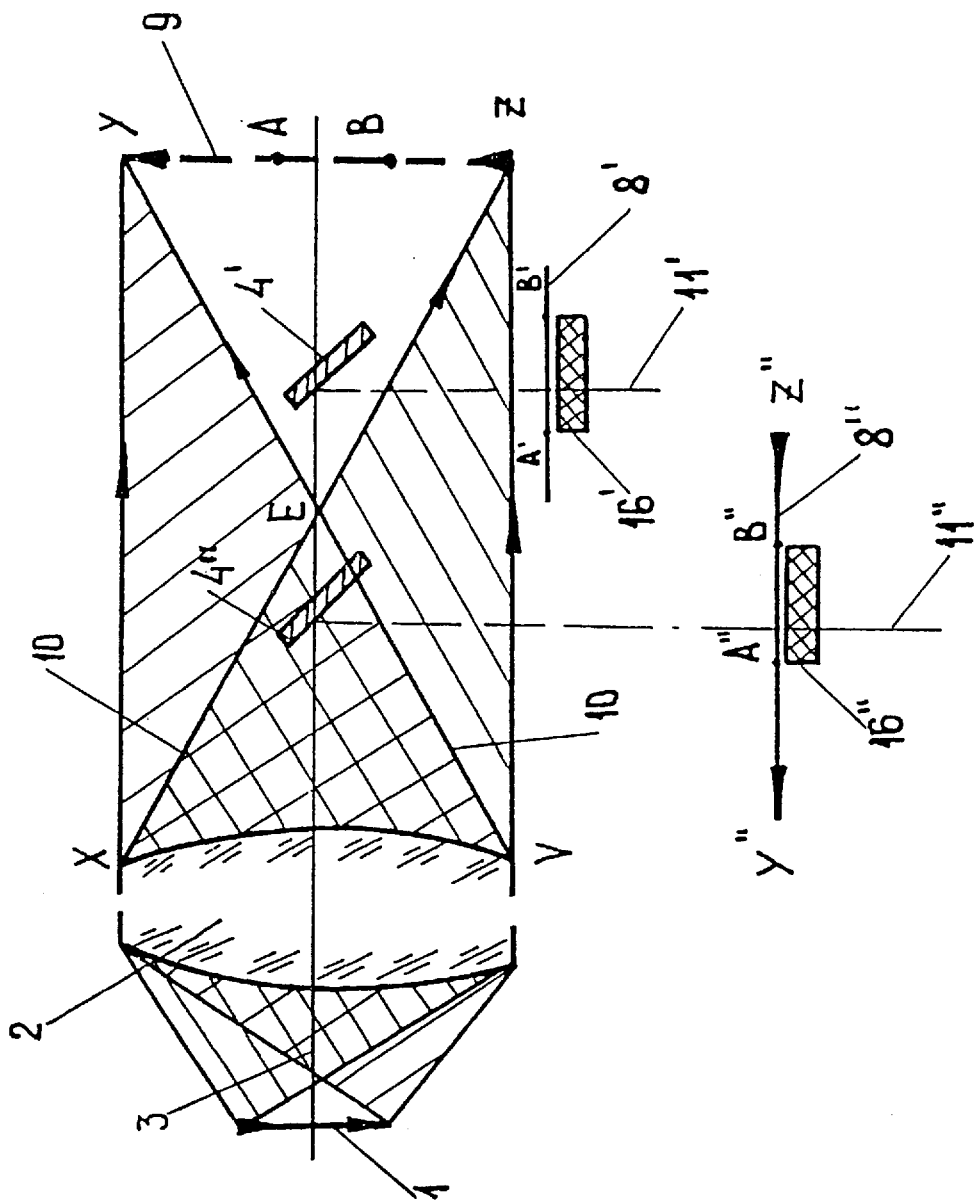

United States Patent
Rubin et al.

[11] Patent Number: 5,835,278
[45] Date of Patent: Nov. 10, 1998

[54] OPTICAL SYSTEM FOR PARTITIONING A REAL IMAGE

[76] Inventors: Leoind Borisovich Rubin, Lomonosovsky prospekt, 14 kv. 499; Viktor Vladimirovich Lazarev, ul. Panferova, 11 kv. 81; Alexandr Tursunovich Rakhimov, Rostovskaya naberezhnaya, 1 kv. 95, all of Moscow, U.S.S.R.

[21] Appl. No.: 59,870

[22] Filed: May 10, 1993

Related U.S. Application Data

[63] Continuation of Ser. No. 787,592, Nov. 4, 1991, abandoned.

[30] Foreign Application Priority Data

Nov. 6, 1990 [DE] Germany ............... 40 35 145.9

[51] Int. Cl.$^6$ .................................................. G02B 27/14
[52] U.S. Cl. .............................. 359/636; 359/730; 354/95
[58] Field of Search ..................... 359/636, 629, 359/618, 373, 730, 726, 471; 354/118, 119, 120, 122, 95

[56] References Cited

U.S. PATENT DOCUMENTS

| | | | |
|---|---|---|---|
| 733,090 | 7/1903 | Szczepanik | 354/629 |
| 1,438,906 | 12/1922 | Douglass | 359/120 |
| 1,490,751 | 4/1924 | Underhill | 359/618 |
| 2,126,930 | 8/1938 | Snyder | 359/629 |
| 2,280,989 | 4/1942 | Welch | 359/618 |
| 2,709,401 | 5/1955 | Jaros | 359/471 |
| 2,929,305 | 3/1960 | Blackstone | 359/471 |
| 3,189,915 | 6/1965 | Tondreau | 359/629 |
| 4,005,285 | 1/1977 | Price | 250/208 |
| 4,192,578 | 3/1980 | Suzuki et al. | 350/320 |
| 4,323,925 | 4/1982 | Abell et al. | 358/213 |
| 4,439,010 | 3/1984 | Doty | 359/373 |
| 4,674,845 | 6/1987 | Matsumura | 359/471 |
| 4,953,950 | 9/1990 | Arata et al. | 350/174 |
| 5,016,109 | 5/1991 | Gaylord | 359/618 |

FOREIGN PATENT DOCUMENTS

| | | | |
|---|---|---|---|
| 743062 | 9/1932 | France . | |
| 743062 | 3/1933 | France | 359/629 |
| 0140529 | 5/1985 | United Kingdom . | |

OTHER PUBLICATIONS

Patent Abstracts of Japan, Method and Apparatus for Reading Picture, Feb. 1989, vol. 13, No. 81 (E–719)23.

Patent Abstracts of Japan, Picture Splitting System High Resolution Image Pickup Device, May 1986, vol. 10, No. 117 (E–400)2.

*Primary Examiner*—Georgia Y. Epps
*Assistant Examiner*—Thomas Robbins
*Attorney, Agent, or Firm*—Stein, Pendorf & Van Der Wall

[57] ABSTRACT

Optical beam-splitting system for partitioning the real image of an object into a plurality of partial images onto image receivers arranged with a distance between them, comprising an objective lens and a plurality of optical elements arranged in the ray path behind the objective lens with each optical element comprising at least one reflecting plane deflecting the path of rays, the optical elements respectively intercepting partial luminous fluxes not interfering with each other, the optical elements being positioned outside of the overlapping region of the rays emanating from the extremities of the object and passing through the objective lens and in front of the image plane of the objective lens.

12 Claims, 8 Drawing Sheets

OPTICAL SYSTEM FOR PARTITIONING A REAL IMAGE

This is a continuation of patent application Ser. No. 07/787,592, filed on Nov. 4, 1991, now abandoned.

The present invention relates to an optical beam-splitting system for partitioning a real image of an object to act upon a plurality of image receivers arranged with a distance between them. Such a system can be used for the electronic registration of images, e.g. in the field of television. The U.S. Pat. No. 4,192,578 teaches a beam-splitting device which, for the generation of a linear image of even brightness, divides the image into two parts which subsequently are again brought to convergence and are so superimposed each other that the area of maximum intensity of one partial image coincides with the area of minimum intensity of the other partial image.

The U.S. Pat. No. 4,439,010 shows a beam-splitting device to be used for bonding lead wires to the conductive pads of integrated circuits in conjunction with optical microscopes. This device combines two partial images of one sole image or of different images to form a uniform image.

The partitioning of an image into parts and the generation of the partial images in spaced-apart areas becomes necessary if an image is to be registered the dimensions of which are larger than the image receiver to be used. The image receivers may be television receiver tubes or CCD-arrays. It is not advisable to reduce the image so as not to exceed the dimensions of the image receiver because in this case the resolution of the registration suffers due to the finite dimensions of the elementary points of the receiver, such as the dimensions of the pixels of a CCD-array.

It is not possible either to avoid these difficulties by arranging a plurality of image receivers one beside the other because the active receiving surface necessarily is smaller than the surface within the outer boundaries of the receiver. The parts of the image projected onto the peripheral frame or casing would be lost. Only if the image is partitioned into a plurality of spaced-apart parts and each part is received by an image receiver, then the registered partial images can be subsequently combined without loss to form the complete image by an electronic image processing technique.

The European patent 0 140 529 B1 shows an imaging device for the solution of this problem in the case of a linear object. This device consists of an objective lens and two optical elements arranged immediately behind this lens, one of which is a glass plate with parallel sides and the other a glass plate having a wedged shape, both forming a unitary block. This device generates two images of a linear object in one image plane, lying in a distance from each other. The image generated by the beam which has passed the wedge shaped plate is off-set away from the axis of the objective lens. One half of each image is received by a pertaining image receiver and the signals of both receivers are combined to form the complete image.

One drawback of this device is that for the lateral displacement of one beam use has to be made of the refraction at the planes of the wedge shaped plate. Therefore, chromatic aberrations can be present in the set-off image, reducing its quality. To keep such aberrations small the angle between the surfaces of the wedged shaped element has to be small, which, on the other hand, has the result that the distance between the partitioned images is small. The use of this device for creating a plurality of images of a two-dimensional and not a linear object is difficult because such images would overlap each other.

A device known from the U.S. Pat. No. 4,005,285 also generates two images of a linear object lying parallelly one beside the other. This is achieved with the help of a Koster's prism arranged behind an objective lens. Here, the doubling of the images is not brought about by a refraction of the beams but by a reflection at the prism planes.

The common drawback of both devices considered above is that a plurality of complete images is generated, and only a part of each of these images is used subsequently. Thus, a great deal of the luminous flux generating the images is not put to use, which diminishes the brightness of the partial images used for further processing.

The U.S. Pat. No. 4,323,925 teaches a device aiming at the solution of the same problem as the present invention. This device consists of an objective lens and reducing (minifying) optical elements arranged behind the objective lens. The entry windows of these optical elements are arranged in the image plane of the objective lens with no distance one beside the other so that the image generated by the objective lens is received without loss. The reduced partial image generated by each optical element lies spaced-apart from the neighbouring partial image so that in the image plane of these partial images image receivers can be arranged with spaced-apart receiving surfaces and still receiving the complete partial image. Thus, the original image is registered without loss. Thus, for a complete recordal of the image a plurality of image receivers such as CCD-arrays or television camera tubes can be used, the frames or casings of which are so arranged as to lie between the partial images of the optical elements. As optical elements for this purpose minifying lenses can be used, or tapered coherent fiber-optic bundles, or electronic-optical minifying image converters.

One drawback of this device is the necessity of an additional optical processing of each partial image which invariably leads to additional distortions. If, for example, minifying optical elements in the form of simple lenses are used, aberration image defects will be observed. To reduce such defects, use has to be made of objective lens arrangements with a plurality of lenses for the compensation of the aberrations. This would greatly increase the dimensions, the weight and the costs of the device. The same is true if electronic-optical image converters are used. Also expensive is the use of optical elements in form of bundles of tapering optical fibers. In the latter case additional difficulties in combining the partial images to form the complete image are to be expected. The reason for this is that there is no possibility of overlapping the partial images near their edges and that in these edge areas distortions of the partial images are unavoidable.

It is an object of the present invention to create an optical system for partitioning a real image into partial images spaced with a distance between them so that the partial images can be registered without loss by image receivers,the receiving surfaces of which cannot be arranged without distance one next to the other. Additionally, a partial overlapping in the peripheral areas of the partial images should be possible and no additional distortions should ensue other than those caused by the objective lens.

Starting out from an optical beam-splitting system of the last of the above considered kind with an objective lens and optical elements arranged behind the lens in the path of rays of the same for intercepting partial luminous fluxes, according to the invention the problem is solved by the features that each optical element consists of at least one reflecting plane deflecting the path of rays and that each optical element intercepts a partial luminous flux behind the objective lens without blocking off the other elements, and that the optical elements are arranged outside of the overlapping region of the beams emanating from the extremities of the object and passing through the objective lens and in front of the image plane pertaining to the objective lens.

The factor that the optical elements deflect the paths of rays not by refraction as in the embodiment according to the European patent 0 140 529 B1, but by means of reflecting planes, allows larger displacements of the partial images and displacements without the occurrence of considerable chromatic aberrations in the optical system.

The arrangement of the optical elements in the defined region along the axis of the objective lens has the consequence that each element intercepts only the partial luminous flux comprising the informations to be registered by this optical element, and not a complete information on the object. Thus, the utilization of the luminous energy behind the objective lens is better. At the same time an overlapping of the border areas of the partial images is achieved, which facilitates the combination of the partial images to form the complete images in the further process. The width of the overlapping border areas depends upon the location of the optical elements along the axis of the objective lens: The farther this location is placed to the rear and nears the image plane of the objective lens, the smaller these border stripes become and the less overlapping is obtained.

If the arrangement of the image receivers for the partial luminous fluxes is not subject to limitations, it may be expedient that the image receivers consist of a reflecting plane deflecting the path of rays at approximately right angles from its original direction and that the image receivers are distributed in radially opposite relationship along the periphery and that the receiving surfaces are oriented at approximately right angles with respect to the axis of the objective lens.

If it is a condition that all image receivers lie in one common plane, it will be expedient if each optical element consists of two reflecting planes, the first of which deflects the intercepted luminous flux radially outwards and the second of which deflects the luminous flux back into a direction at least approximately parallel to the original direction, and that the length of the optical path of all luminous fluxes is the same, so that the image planes of the partial images lie in one plane.

It is essential for the generation of all partial images in one common plane that the optical elements are so designed that the lengths of the projections of the geometrical paths of beams onto the optical axis of the objective lens on their way from the objective lens to the partial images are the same. The amount and the direction of the displacement of each partial image depends upon the form and the character of the arrangement of the optical element under consideration. If the optical system consists of a plurality of, with respect to their form, identical optical elements, a corresponding number of partial images spaced from each other can be obtained by arranging the elements behind the objective lens so that their first reflective surfaces in the path of rays are not arranged paralled but so that they include equal angles with the axis of the objective lens.

Normally the object to be registered is centrosymmetric, so that it can preferably be subdivided into sectors. For this purpose, also the optical elements are preferably in the form of sectors and lie behind the objective lens in symmetrical arrangement with respect to the axis.

The reflective surfaces of the optical elements may be plane mirrors, i.e. plane areas of solid bodies. The application of a reflecting coating on these areas enhances the reflection coefficient and thus the illumination intensity of the partial image generated. The application of a spectrally selective coating allows to generate each part of the image in a specific range of the spectrum. This allows a spectral processing of the images.

It contributes to the mechanical strength if each optical element is formed by prism planes with the prisms being transparent in the selected spectral range. In this case it is expedient to make use of the effect of total inner reflection by choosing the angle of incidence accordingly.

The optical elements can be known reflecting prisms, taken singly or in combination with mirrors. Reflective coatings are applied to the reflective planes of optical prism elements, especially if the angle of incidence of the rays onto these planes is small.

Figure 2:
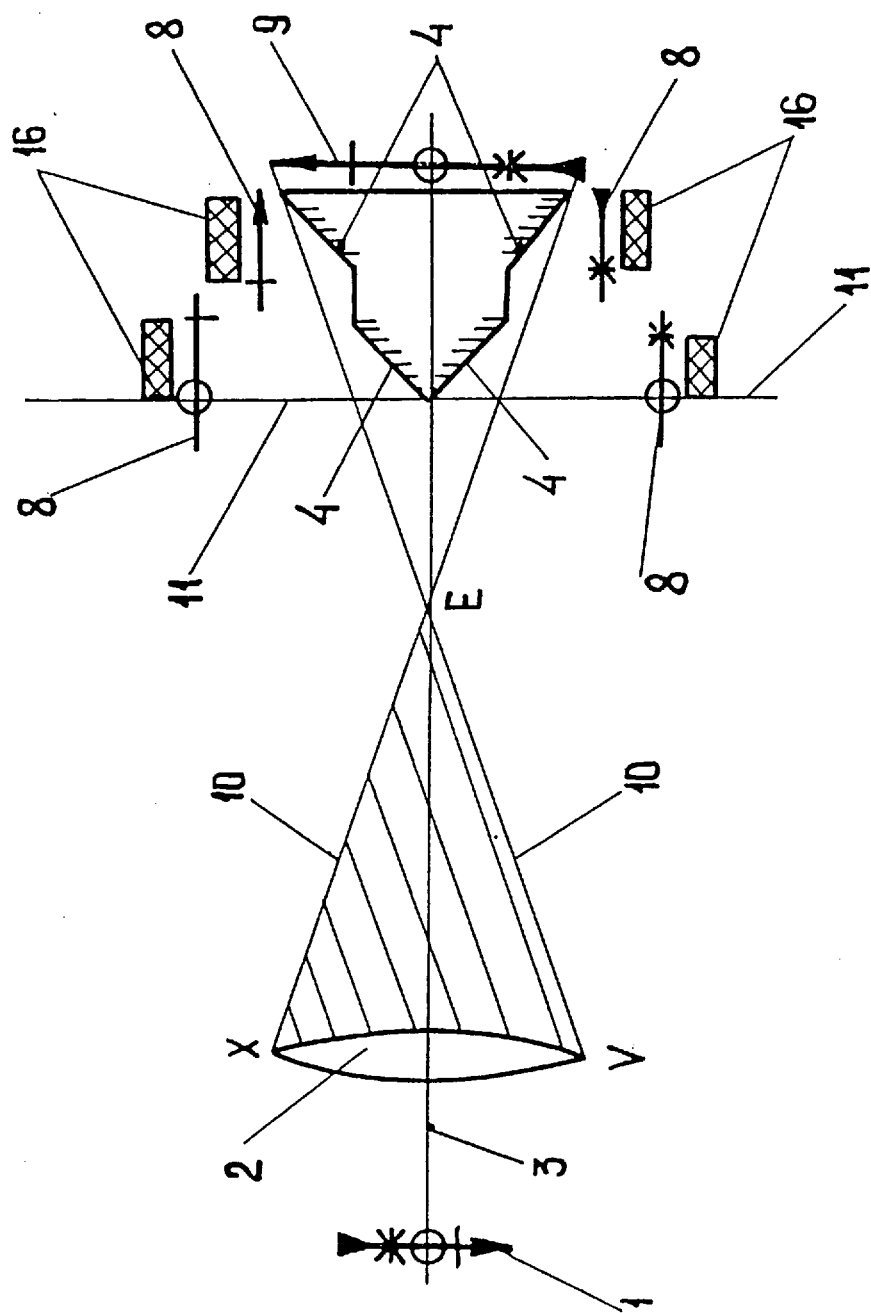
Figure 3:
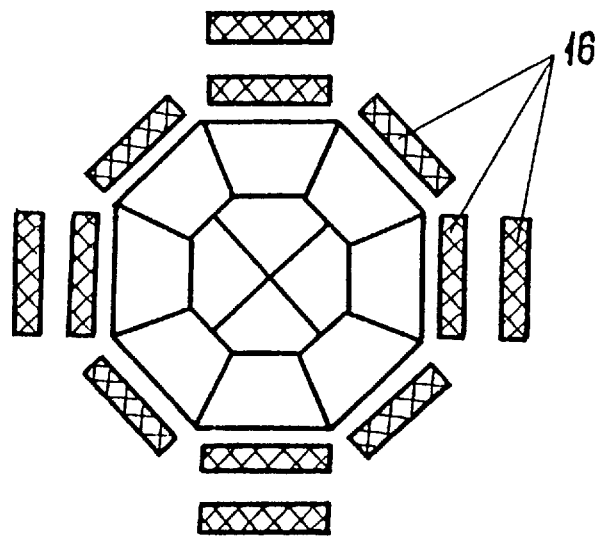
Figure 4:
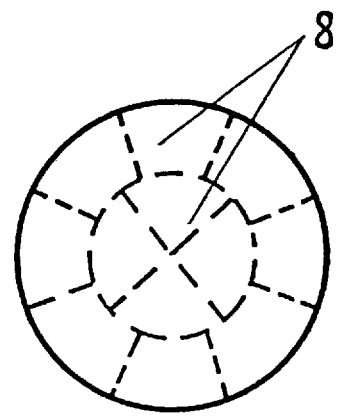
Figure 5:
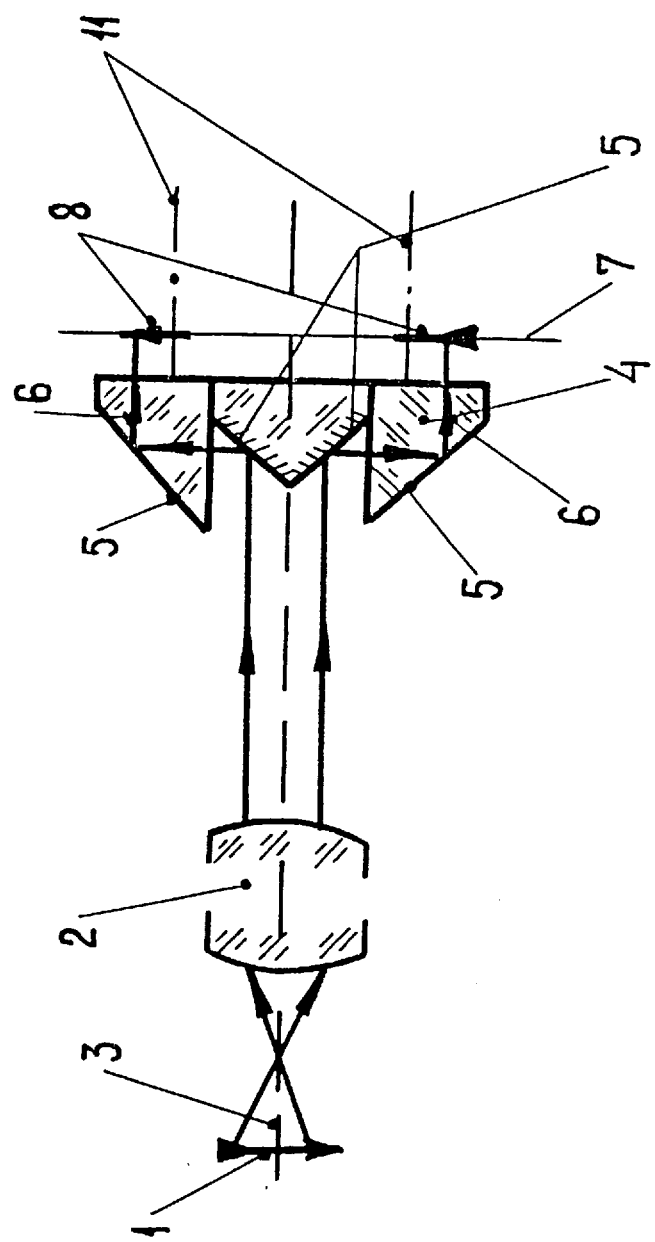
Figure 6:
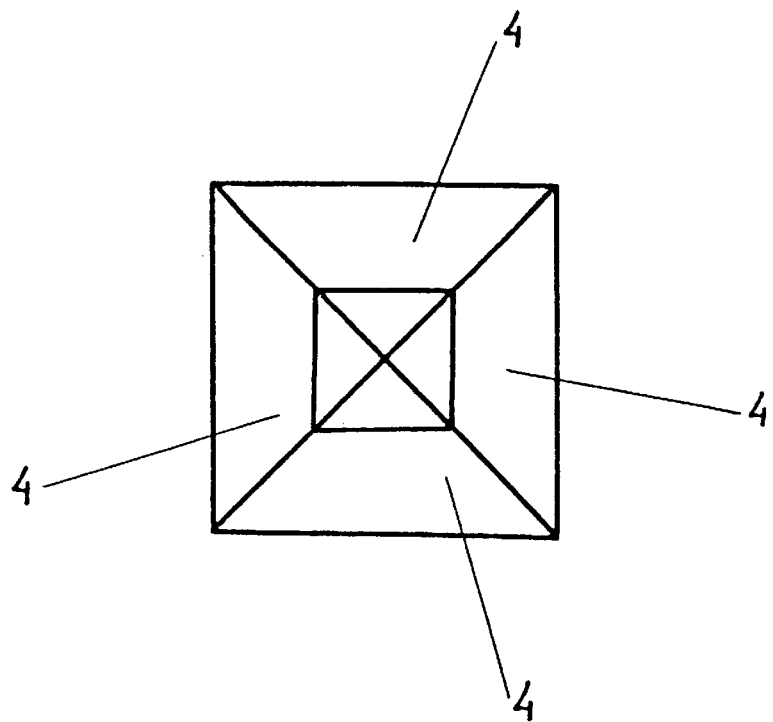
Figure 7:
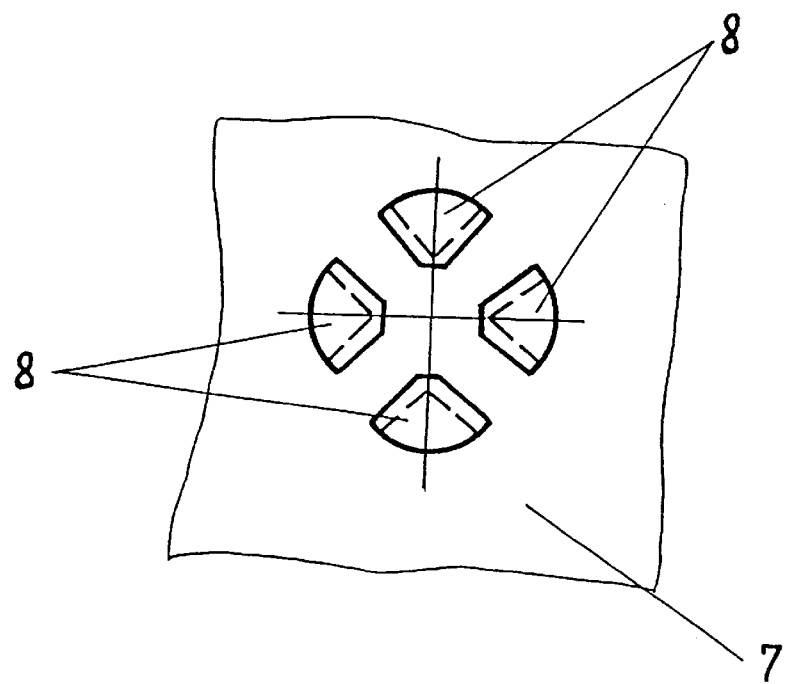
Figure 8:
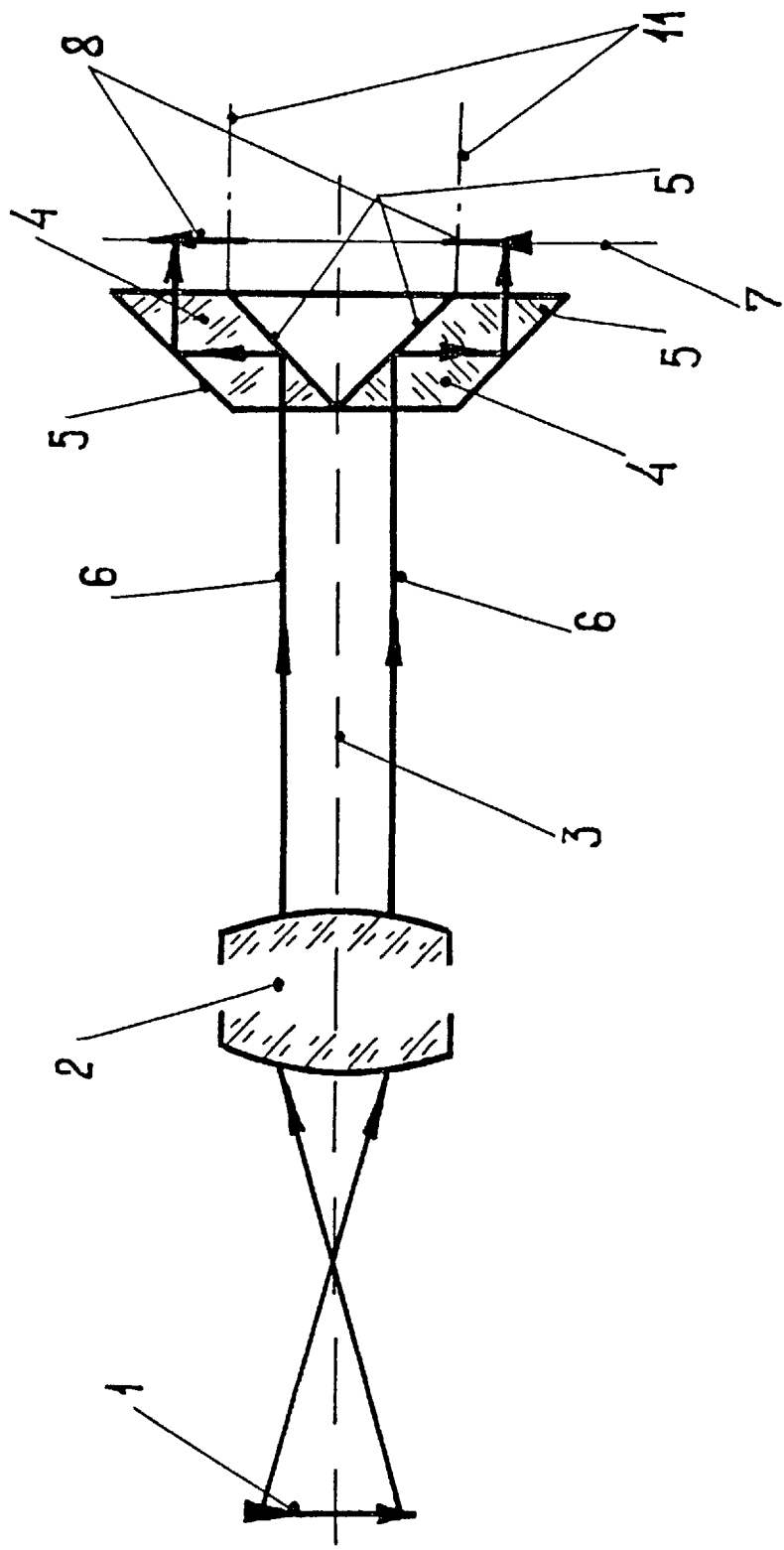
Figure 9:
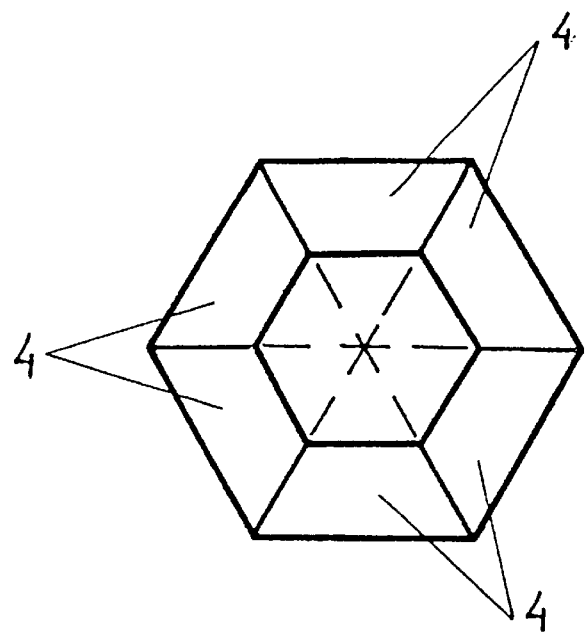
Figure 10:
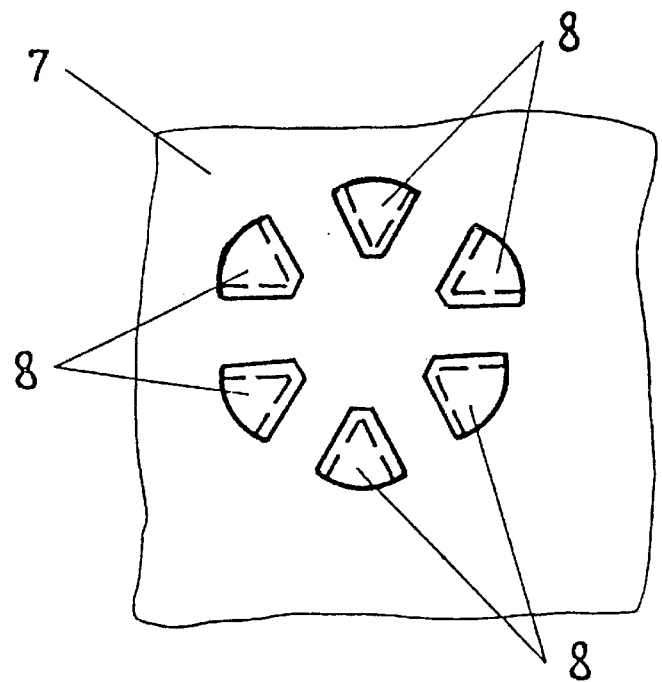
Figure 11:
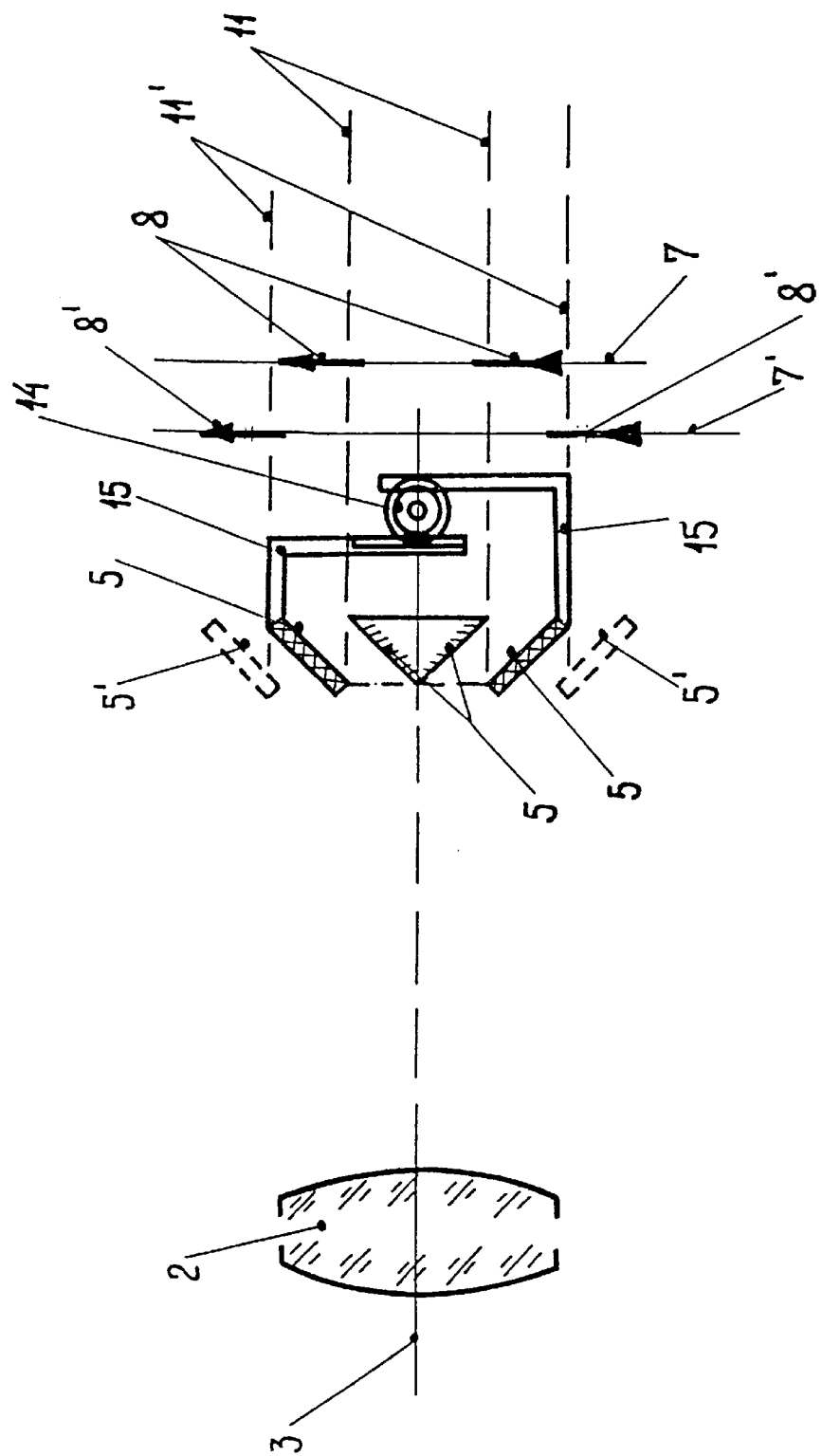

Below, the invention will be further explained by the description of embodiments, referring to the attached drawings. The drawings represent:

FIG. 1 schematically the regions behind an objective lens for the arrangement of the optical elements;

FIG. 2 the axial section of a device with mirror planes in the form of sectors for partitioning an image into twelve partial images;

FIG. 3 a view of the arrangement according to FIG. 2, seen from the side of the objective lens;

FIG. 4 the composition of a complete image from partial images, which were generated by the device according to FIGS. 2, 3;

FIG. 5 the axial section of a beam-splitting device with optical elements, each consisting of two reflecting planes;

FIG. 6 the view of the optical elements according to FIG. 5, seen from the side of the objective lens;

FIG. 7 the location of the partial images, generated by the system according to FIGS. 5, 6, in the image plane;

FIG. 8 the axial section of an optical beam-splitting device with optical elements in the form of rhombic prisms;

FIG. 9 the view of the prism elements according to FIG. 8, seen from the side of the objective lens;

FIG. 10 the location of the partial images, generated by the system according to FIGS. 8, 9 in the image plane;

FIG. 11 schematically the axial section of a beam-splitting device, in which the distance between the partial images is variable.

FIG. 1 shows the paths of rays emanating from an object 1 and passing through an objective lens 2. Two beams are shown, the border lines of which are the rays emanating from the extremities of the object and passing through the objective lens as marginal rays (or rim rays or peripheral rays). It is assumed that the pupil of the objective lens is the entire exit area of the same. The rays emanating from the individual points of the object, represented by an arrow, converge in the image plane lying perpendicular to the axis 3 to form the image 9. The extremities are denoted with the references Y (point of the arrow) and Z (tail of the arrow).

The beams emanating from both extremities of the object and passing through the objective lens are hatched. The inclination of the hatching lines is different, so that the overlapping region behind the objective lens, the borders of which are denoted with the numeral 10, is hatched in a crosswise fashion. This region may be termed "zone of complete information" because any beam intercepted in this region includes rays reaching the extremities of the object and thus contains complete information on the object. This region is, in the axial section, in the form of a triangle VXE and may be described as the overlapping region of the beams emanating from the extremities of the object and passing through the objective lens.

An optical element 4" arranged in this zone of complete information is able to project a beam generating a complete image 8" along a deflected optical axis 11" onto an image receiver 16". If, however, the image receiver 16" should intercept only a partial image, e.g. some middle section A"B" of the complete image Y"Z", the rays passing outside the boundaries of the image receiver 16" will not be put to use and their luminous energy will be lost.

If an optical element 4' is arranged outside the zone of complete information, i.e. especially behind this zone in the region of the triangle EYZ, not all points of the object 1 will be registered. The optical element 4' arranged somewhere in the center on the axis 3 of the objective lens will receive only rays emanating from a central section of the object 1, and the beam along the deflected optical axis 11' generates only a partial image 8' of the central part A'B' of the object. If only this part is to be registered, no luminous energy is lost and a higher brightness of the image is achieved and no blocking-off occurs.

Thus, if the image 9 normally generated by the objective lens 2 is to be replaced by partial images with the highest possible luminous energy and overlapping in their border areas to allow a fault-free joining of the partial images in the later assembly of the complete image, the deflecting optical elements have to be arranged outside the zone VXE of complete information and in front of the image plane 9 of the objective lens.

FIGS. 2, 3, and 4 illustrate an optical system with twelve optical elements 4 in the form of reflecting planes arranged behind an objective lens 2 with an optical axis 3. The reflecting planes are formed on a single-piece body and are inclined at an angle of 45° relative to the path of rays. Four planes occupy the central area and are surrounded by eight planes occupying the periphery. The body forming these planes is arranged behind the zone VXE of complete information symmetrically on the axis 3 of the objective lens and is surrounded by image receivers 16, each of which registers and processes a partial image 8.

Without the optical elements 4 the objective lens 2 would generate the image 9 also shown for reference in its image plane. To further illustrate the partition of this image 9 into the partial images 8, the object 1 is again represented in the form of an arrow and three additional points, located between the extremities point and tail, are marked, one by means of a cross bar, one by means of a circle, and one by means of an asterisk. These marks are also indicated in the partial images 8 and illustrate the partitioning of the complete image into the partial images.

The view of the body with the optical elements 4 in form of facets, seen from the side of the objective lens 2, as well as the surrounding image receivers 16 is shown schematically in FIG. 3. The partial images 8 overlap along their borders so that no information is lost and the total image according to FIG. 4 can be assembled completely from the partial images, for example by means of an electronic image processing.

If it is essential that the partial images 8 lie in a common plane, each optical element, for example the optical elements shown in FIG. 5, comprises two reflective planes. In such an embodiment, shown in FIGS. 5, 6, and 7, the beam-splitting device consists of five prisms, which are glued together. A central prism forms four first reflecting planes 5 which, functioning as mirror surfaces, deflect the incident beams radially outwards. These surfaces are covered with a reflective or a selectively reflective coating. The central prism is surrounded by four sector elements in the form of identical isosceles prisms, in which an inner total reflection occurs at reflective surfaces 5, which are oriented parallelly to the first reflective surfaces 5 of the central prism. One first reflective surface and one pertaining second reflective surface 5 form a ray-deflecting optical element.

The second reflective surfaces direct the pertaining path of rays back to the original direction of incidence, which leads to four beams apart from each other, generating four partial images, which according to FIG. 7 lie on the corners of a square in a common image plane.

The effect of the optical elements is illustrated by means of the rays 6, parallel to the axis behind the objective lens. Each optical element effects a parallel displacement of all incident rays and the lateral displacement of these parallel rays corresponds to the lateral displacement of the pertaining partial image 8.

Each of the partial images 8 has an overlapping border stripe, which is also present in the neighboring partial image, so that an assembly of the complete image without loss of information is assured. In FIG. 7 the core of the partial images, from which the complete image is composed, is set-off from the overlapping borders by a dotted line.

FIGS. 8, 9, and 10 show an optical system with a prism beam-splitting device, which partitions the image into six partial images 8, lying in a common image plane 7 as shown in FIG. 10. The beam-splitting device consists of six rhombic prisms of identical form, each occupying a sector and forming an optical element 4. These optical elements are glued to each other and are arranged symmetrically with respect to the axis 3 of the objective lens. The partial images 8 generated by this arrangement lie on the corners of a hexagon, as shown in FIG. 10, and again the dotted lines show, how the core areas to be joined together look like, and how the overlapping borders form peripheral stripes.

FIG. 11, finally, shows a beam-splitting device in which the distance of the partial images from each other is adjustable. The optical elements behind the objective lens 2 comprises a first reflective surface 5 deflecting the incident rays outwards, and a second reflective surface 5', deflecting the path of rays back to the original direction, so that the optical axes 11 of the partial beams are oriented parallelly displaced with respect to the optical axis 3 of the objective lens 2. The partial images 8 generated by these partial beams lie in a common image plane.

The second reflective surfaces 5' each are attached to a rack 15, which mesh with a gear 14 at diametrally opposite locations. A rotation of the gear 14 moves the second reflective surfaces symmetrically outwards or inwards, e.g. into the position denoted with the numeral 5', which brings about a change of the distance of the second reflective surfaces from the axis 3 of the objective lens.

In FIG. 11, the dotted lines show a position of the second reflective surfaces 5' in greater radial distance, as well as the partial images 8' generated in this location of the second reflective surfaces. These partial images 8' lie in a common image plane 7', which is nearer to the objective lens 2, and with a greater distance between them, as the partial images 8, which are generated by the second reflective surfaces 5' nearer to each other in the image plane 7 farther away from the objective lens.

It is to be understood that the radially adjustable arrangement of the second reflective surfaces 5' according to FIG. 11 is possible also in an embodiment comprising more than two second reflective surfaces 5'. For example, the axis of the gear 14 can coincide with the axis 3 of the objective lens and the racks of a plurality of second reflective surfaces, distributed evenly around this axis, mesh at appropriate, evenly distributed points with this gear.

The invention can be put to use in astronomy, where the registration of the objects requires large imaging areas as well as high resolution. Presently, these requirements are met by using photographic films of large formats. This is expensive and the films are difficult to store. The use of television techniques in combination with the optical system presently proposed allows the generation of images with high resolution and the registration by means of a plurality of image receivers, so that the costs for the photographic materials, which can be used only once, can be saved. The storage of the images obtained is much easier, because the storing can take place in the form of electric signals in appropriate background stores.

Similar advantages may be obtained in the field of X-raying, especially in the processing and storing of X-ray-images in medicine, where large-area images are to be registered also with high resolution.

What is claimed is:

1. An optical beam-splitting system for partitioning the real image of an object into a plurality of partial images onto image receivers arranged with a distance between them, comprising in combination:

an objective lens and a plurality of optical elements arranged in a ray path behind the objective lens with each optical element comprising at least one reflecting plane deflecting the path of rays, the optical elements respectively intercepting partial luminous fluxes not interfering with each other, the optical elements being positioned outside of the overlapping region of the rays emanating from the extremities of the object and passing through the objective lens and in front of the image plane of the objective lens.

2. The optical beam-splitting system according to claim 1, wherein each of the optical elements comprises a reflecting plane deflecting the path of rays at approximately right angles from its original direction and wherein the image receivers are distributed in radially opposite relationship along the periphery with their receiving surfaces oriented at approximately right angles with respect to the axis of the objective lens.

3. The optical beam-splitting system according to claim 1, wherein each of the optical elements comprises two reflecting planes, the first of which deflects the intercepted luminous flux radially outwards and the second of which deflects the luminous flux back into a direction at least approximately parallel to the original direction, with the length of the optical path of all partial luminous fluxes being the same, so that the image planes of the partial images lie in one plane.

4. The optical beam-splitting system according to claim 1, wherein the optical elements are arranged in central symmetry and each of the optical elements deflects a sector of the cross section of the luminous flux.

5. The optical beam-splitting system according to claim 1, wherein the reflecting planes of the optical elements are mirrors.

6. The optical beam-splitting system according to claim 5, wherein at least one of the mirrors is spectrally selective.

7. The optical beam-splitting system according to claim 1, wherein the optical elements are prisms of optically transparent material.

8. The optical beam-splitting system according to claim 7, wherein the prisms are rhombic prisms.

9. The optical beam-splitting system according to claim 7 wherein the reflecting plane comprises a reflective coating.

10. The optical beam-splitting system according to claim 1, wherein at least one of the reflective planes of each of the optical elements coated with a spectrally selective reflective coating.

11. The optical beam-splitting system according to claim 1, wherein each of the optical elements comprises reflecting planes including a first reflective surface deflecting the intercepted luminous flux outwardly, and a second reflective surface deflecting this luminous flux back into the direction of original incidence, the reflective planes being arranged symmetrically with respect to the axis of the objective lens and wherein the distances of the second reflective surfaces from the axis of the objective lens are variable, while maintaining the symmetry.

12. The optical beam-splitting system according to claim 11, wherein the second reflective surfaces are connected with respective racks meshing with evenly distributed points of a gear.

* * * * *